US012659436B2

(12) United States Patent
Walcher et al.

(10) Patent No.: US 12,659,436 B2
(45) Date of Patent: Jun. 16, 2026

(54) METHOD FOR VISUALIZING A PLAN IN REAL DIMENSIONS AND FOR CONSTRUCTING AN OBJECT

(71) Applicant: Schöck Bauteile GmbH, Baden-Baden (DE)

(72) Inventors: Wolfgang Walcher, Graz (AT); Bernhard Reitinger, St. Marein (AT)

(73) Assignee: Schöck Bauteile GmbH, Baden-Baden (DE)

( * ) Notice: Subject to any disclaimer, the term of this patent is extended or adjusted under 35 U.S.C. 154(b) by 423 days.

(21) Appl. No.: 18/257,126

(22) PCT Filed: Nov. 15, 2021

(86) PCT No.: PCT/EP2021/081618
§ 371 (c)(1),
(2) Date: Jun. 13, 2023

(87) PCT Pub. No.: WO2022/128280
PCT Pub. Date: Jun. 23, 2022

(65) Prior Publication Data
US 2024/0106995 A1     Mar. 28, 2024

(30) Foreign Application Priority Data
Dec. 15, 2020     (EP) ..................................... 20213988

(51) Int. Cl.
*H04N 9/31*           (2006.01)
*G01B 11/25*          (2006.01)
*G06T 11/00*          (2026.01)
(52) U.S. Cl.
CPC ....... *H04N 9/3185* (2013.01); *G01B 11/2513* (2013.01); *G01B 11/2545* (2013.01); *G06T 11/00* (2013.01); *H04N 9/3194* (2013.01)

(58) Field of Classification Search
None
See application file for complete search history.

(56) References Cited

U.S. PATENT DOCUMENTS

| | | | |
|---|---|---|---|
| 9,319,649 B2 * | 4/2016 | Grundhofer | H04N 1/60 |
| 10,210,607 B1 * | 2/2019 | Weinschenk | H04N 9/3194 |
| 11,463,669 B2 * | 10/2022 | Fan | G06T 5/80 |

FOREIGN PATENT DOCUMENTS

| | | |
|---|---|---|
| DE | 10127304 A1 | 12/2002 |
| WO | 2019029991 A1 | 2/2019 |

OTHER PUBLICATIONS

International Search Report, mailed Feb. 10, 2022, from PCT/EP2021/081618.

* cited by examiner

*Primary Examiner* — Saptarshi Mazumder
(74) *Attorney, Agent, or Firm* — Workman Nydegger

(57) ABSTRACT

A method of visualizing a plan in real dimensions, wherein, in a calibration step, using a grid reflection method, a transmission pattern is projected onto a projection surface by means of a projection unit, and a reception pattern reflected from the projection surface is detected by at least two sensor units, and a surface shape and a location of the projection surface in relation to a position of the projection unit and to a position of the sensor units are detected by means of a computer unit connected to the projection unit and the sensor units, based on a distortion of the reception pattern in comparison to the transmission pattern, and a projection distortion is performed on the plan by means of the computer unit based on the surface shape and the location of the projection surface in relation to the projection unit, as detected in the calibration step, and the distorted plan is projected by the projection unit onto the projection surface in such a way that the projected plan on the projection (Continued)

surface corresponds to an undistorted, plane representation
of the plan in real dimensions.

18 Claims, 5 Drawing Sheets

METHOD FOR VISUALIZING A PLAN IN REAL DIMENSIONS AND FOR CONSTRUCTING AN OBJECT

BACKGROUND OF THE INVENTION

The invention relates to a method of visualizing a plan in real dimensions.

In the field of industrial construction, for example of parts of buildings or of complex machines, constructional elements are arranged in a predetermined order according to construction plans and are connected to one another in a complex process. In particular in case of precast concrete parts, but also, for example, in mechanical engineering and in the context of manufacturing lines in the automotive industry or in aircraft construction, some production steps are thus carried out manually by workers and other production steps are carried out by machines. In order to ensure a smooth production process, high product quality and high manufacturing precision, as well as to rule out any defects in the finished products, it is imperative that the correct constructional elements are installed in a precisely defined position and, in some cases, also in a precisely defined sequence.

For example, in the field of precast concrete parts, constructional elements of a reinforcement, such as, e.g., metal rods, are arranged in a grid. For this activity, it is essential that a specified grid width and a defined distance from a surface of the finished concrete part are maintained.

A major challenge in the construction of precast concrete parts is that elements such as, for example, empty piping run in precast concrete parts, which elements are cast into the concrete during the construction of the precast concrete part. This presupposes that appropriate recesses or, respectively, empty spaces are present in the reinforcement for arranging these empty pipeworks and prefabricated elements in the concrete part. Conventionally, workers arrange the reinforcing elements of a concrete part by hand according to a plan, wherein such recesses have to be taken into account already during this work step. However, this is associated with a significant expenditure of time and necessitates a high degree of attention, precision and spatial perception. If a recess is forgotten, or if the reinforcing elements are not arranged precisely, the reinforcement must be reworked after completion and before it is filled with concrete. In this case, the reinforcing elements are cut through, as a result of which the reinforcement usually no longer has the necessary structural integrity. If this is not corrected, for example by additional reinforcements, the result can be damage or, respectively, cracks in the finished concrete element. In the worst case, the reinforcement on the finished concrete element fails completely at the resulting weak point, and the concrete element cracks or shatters under load. On the one hand, this constitutes a significant safety risk and, on the other hand, in the event of such a quality defect, the concrete part has to be replaced at the construction site, which entails considerable additional costs and construction delays. A precise production and a high standard of quality assurance in the manufacture of concrete parts are therefore essential.

In mechanical and plant engineering or in the field of manufacture in the automotive industry or in the aircraft industry, components that have been manufactured or installed in a faulty manner or not according to specifications can also pose a significant safety risk and/or lead to expensive consequential damage and delays.

U.S. Pat. No. 10,210,607 B1 discloses a method of projecting a plan for a truss onto a construction table.

Several pairs of projection units and cameras are used for this purpose. It is described in connection with FIG. 3A that a calibration can be carried out by projecting a geometric pattern. However, it is necessary that a user manually measures the projected pattern, whereby these data are linked to the image captured by the camera.

The invention is based on the object of avoiding these disadvantages and problems of the prior art.

BRIEF SUMMARY

According to the invention, the object is achieved by providing a method of visualizing a plan in real dimensions, wherein, in a calibration step, using a grid reflection method, a transmission pattern is projected onto a projection surface by means of a projection unit, and a reception pattern reflected from the projection surface is detected by at least two sensor units, and a surface shape and a location of the projection surface in relation to a position of the projection unit and to a position of the sensor units are detected by means of a computer unit connected to the projection unit and the sensor units, based on a distortion of the reception patterns in comparison to the transmission pattern;

and a projection distortion is performed on the plan by means of the computer unit based on the surface shape and the location of the projection surface in relation to the projection unit, as detected in the calibration step, and the distorted plan is projected by the projection unit onto the projection surface in such a way that the projected plan on the projection surface corresponds to an undistorted, plane representation of the plan in real dimensions.

By means of the method according to the invention, an undistorted plan, for example a reinforcement plan, or a construction plan is projected in real dimensions onto the projection surface. In the course of the calibration step, the surface and thus, for example, bulges in and/or an inclination of the projection surface is/are detected, whereby an appropriate projection correction can be performed during the projection of the plan. In addition, positional data of the projection surface in relation to the projection unit are detected. As a result, it becomes possible that a projection distortion determined in this way is applied to any plan, e.g., the above-mentioned reinforcement plan. Any tilt or bulges in the projection surface is/are thereby corrected, and it becomes possible to project the plan onto the projection surface in an undistorted fashion and in real dimensions. Therefore, a worker no longer has to resort to a separate plan for each work step, interpret it and, for example, arrange a constructional element according to his or her interpretation of the plan. The method according to the invention makes this process considerably easier in that the plan is projected directly, in an undistorted fashion and true to scale in real dimensions. The worker therefore only has to identify the respective constructional element in the projected plan and arrange it directly at the position illustrated in the projected plan. As a result, a whole range of possible sources of error are avoided in the course of construction.

Moreover, the method according to the invention is special in that no manual intermediate step for measuring the projection surface has to be carried out, as was the case, for example, in U.S. Pat. No. 10,210,607 B1. According to the invention, the manual intermediate step for measuring the projection surface can be omitted, since the projected pattern is recorded simultaneously by two sensor units spaced apart from one another, i.e., as a stereoscopic recording, so that a real dimension can be inferred directly from the different views in the images recorded by the sensor units—in combination with the previously known reference pattern.

In a particularly preferred embodiment, the method furthermore comprises the following steps performed prior to said calibration step:

installing the at least two sensor units and the projection unit on a support in a relative position to one another, pre-calibrating the two sensor units and the projection unit relative to one another in a reference environment, preferably by projecting a calibration pattern from the projection unit onto a calibration surface, the computer unit determining the relative position of the two sensor units and the projection unit relative to one another on the basis of recordings of the calibration pattern on the calibration surface, as detected by the sensor units, moving the support with the two sensor units installed thereon and the projection unit from the reference environment to a place of use where said calibration step and the projection of the distorted plan are carried out.

These steps involve the particular advantage that the intrinsic parameters of the system, i.e., determining the mutual distance of the components from one another, but also compensating for lens errors in the sensor units and/or the projection unit, can already be performed in a preliminary step. As a result, the intrinsic parameters of the system consisting of the support, the two sensor units and the projection unit can be pre-calibrated already in a reference environment, e.g., the place of production of the system. Subsequently, the system can be moved to the place of use where the plan is to be projected in real dimensions, which is achieved by the above-mentioned calibration step and the step of projecting the distorted plan. This second, downstream calibration step is therefore a calibration of the extrinsic parameters of the system with respect to the environment in which projection is to take place, i.e., the surface shape of the projection surface and the location of the projection surface in relation to the position of the projection unit and to the position of the sensor units can be detected.

The pre-calibration of the two sensor units and the projection unit relative to one another can be performed in particular in that the projection unit projects a previously known pattern onto a calibration surface which is arranged at a previously known distance from the system consisting of the support, the two sensor units and the projection unit.

In the last-mentioned embodiment, it is preferred if two of the above-mentioned supports, each comprising at least two sensor units and one projection unit, are pre-calibrated in the reference environment, as explained above, and then installed at the place of use where the calibration step performed at the place of use is carried out for the two systems located on the respective supports and composed of at least two sensor units and one projection unit, the sensor units each having such a large field of view that a transmission pattern emitted by the projection unit of the respective other system is located at least partially within the field of view of the sensor units so that a relative mutual distance between the two systems can be determined. As a result, several of these systems can be coordinated with each other, whereby a simple enhancement with several projection units that have not previously been pre-calibrated on a single support can occur. This is achieved by the sensor units recording the transmission pattern of an adjacent projection unit so that the relative distance between the systems can be determined. The computer unit can also take into account this relative distance in the projection distortion so that two projection units can jointly project a plan so that the parts projected by the projection units will directly adjoin each other, for example. This method is also upgradeable to more than two of the systems mentioned.

In the last-mentioned embodiment, it is furthermore particularly preferred if one of the two systems is movable, e.g., displaceable. If required, the work area can then be increased at short notice at any workstation, for example, in order to produce oversized work pieces.

According to a preferred embodiment of the method according to the invention, the calibration step is repeated after a predetermined period of time, after a change in a temperature of the projection unit by more than a predetermined threshold value, as detected by means of a temperature sensor, after a user input on the computer unit, and/or after a shock or movement detected by means of a position sensor, or after a change in the position of the projection unit and/or the sensor units. As a result, a compensation for environmental impacts is achieved, and it is ensured that the projected plan always corresponds to an undistorted, plane representation of the plan in real dimensions.

According to an alternative embodiment variant of the method according to the invention, the calibration step is performed additionally for at least one second projection unit, in which case both projection units could be installed at the place of use, for example, on the same support, on different supports or without a support, with a second transmission pattern being projected onto the projection surface by means of the at least one second projection unit, and a second reception pattern reflected from the projection surface being detected by the sensor units, and the surface shape and the location of the projection surface in relation to a position of the at least one second projection unit and to the position of the sensor units are detected by means of the computer unit connected to the at least one second projection unit and the sensor units, based on a distortion of the second reception pattern in comparison to the second transmission pattern. In addition, a projection distortion is performed on a second plan by means of the computer unit based on the surface shape and the location of the projection surface in relation to the second projection unit, as detected in the calibration step, and the distorted second plan is projected by the second projection unit onto the projection surface in such a way that the projected second plan on the projection surface corresponds to an undistorted, plane representation of the second plan in real dimensions. As a result, the advantage is obtained that one or several plans can be projected onto a larger area of the projection surface. For example, the area that can be covered by means of the method according to the invention can be enlarged and expanded at will by adding the second projected plan to the projected plan. In this case, several projection units, for example, project different parts of an overall plan onto at least partially overlapping or even different areas of the projection surface. The projected plans can also comprise different partial assembly sections such as installation plans, electrical plans and/or reinforcement plans. In addition, the accuracy or, respectively, the resolution of the projected plans can also be increased as a result. This can also be done by reducing the distance between the projection unit or the projection units and the projection surface or by increasing the focal length of the projection unit. Both of these approaches also lead to an increase in the luminance and brightness of the projected plan or the projected plans.

According to the preferred embodiment of the method according to the invention, a position marker is included in the projected plan, and the method comprises detecting the position marker with an augmented reality-enabled portable device such as a smartphone, augmented reality glasses, or a tablet computer. The augmented reality-enabled portable device determines its position in relation to the projected plan on the basis of the detected position marker and preferably the position of the sensor units and/or the projection unit and supplements the projected plan with a two-dimensional or three-dimensional representation of a constructional element in real dimensions. As a result, additional information, which would be representable inadequately solely by a projection, can be made available to a user. Moreover, it thereby becomes possible that varying additional information, which could be relevant for different activities on the same object, is issued to different persons.

In addition, the position of a position marker attached to the projection surface can also be detected by means of the computer unit in the calibration step using the sensor unit. This position marker can subsequently also be detected by the augmented reality-enabled portable device, with the augmented reality-enabled portable device determining its position in relation to the projected plan on the basis of the detected position marker and preferably the position of the sensor units and/or the projection unit.

The method according to the invention is preferably upgradeable to a method of constructing an object, the latter method additionally comprising the steps of arranging at least one constructional element contained in the projected plan according to a position on the projection surface as intended for this constructional element in the projected plan; determining a deviation of a position and/or a shape of the constructional element arranged on the projection surface from the position intended for this constructional element in the projected plan and/or a predetermined shape, using the sensor units;

and correcting the position of the constructional element arranged on the projection surface so that it corresponds to the position intended for this constructional element in the projected plan and/or replacing the constructional element arranged on the projection surface with a constructional element whose shape corresponds to the predetermined shape.

In this way, it is ensured that all constructional elements are arranged according to plan.

In addition, using the method according to the invention, a marking on the constructional element arranged on the projection surface can also be detected by means of the sensor units, and the constructional element can be identified on the basis of the detected marking. For example, a serial number, a material or a type of the constructional element can be determined by the computer unit on the basis of the detected marking. The method according to the invention can comprise matching the marking of the constructional element arranged on the projection surface with a marking predetermined for this constructional element and, in case of a deviation of the detected marking from the predetermined marking, replacing the constructional element with a constructional element having a marking corresponding to the predetermined marking. The marking on the constructional element can be, for example, a colour, a geometric shape such as a QR code or the like.

In addition, an optical and/or acoustic signal is preferably issued by means of the projection unit and/or a loudspeaker, if the position and/or the shape of the constructional element on the projection surface deviates from and/or corresponds to the position intended for this constructional element in the projected plan and/or the predetermined shape. As a result, workers are made aware of a work step that has been carried out incorrectly or, respectively, a constructional element that has been arranged incorrectly, or are informed of a work step that has been carried out correctly.

According to the preferred embodiment, the method of constructing an object furthermore comprises detecting a number of constructional elements arranged on the projection surface by means of the sensor units; and comparing the detected number of constructional elements with a number of constructional elements as intended in the projected plan. As a result, it is ensured that no constructional element is forgotten. In addition, an optical and/or acoustic signal is preferably issued by means of the projection unit and/or the loudspeaker, if the detected number of constructional elements corresponds to and/or deviates from the intended number of constructional elements.

In a further step, the calibration step can be performed once more, if the number, the shape and the position of the constructional elements arranged on the projection surface correspond to the number, shape and position intended in the projected plan. As a result, the surface shape of the projection surface and its location in relation to the position of the projection unit and to the position of the sensor units is determined once more, since the surface shape in particular has changed due to the arrangement of the constructional elements. As a result, the changed surface shape of the projection surface is taken into account in the projected plan, whereby the projected plan on the projection surface again corresponds to an undistorted, plane representation of the plan in real dimensions. The calibration step can also be repeated at any time, as already mentioned, for example, after a predetermined period of time, after a change in a temperature of the projection unit by more than a predetermined threshold value, as detected by means of a temperature sensor, after a user input on the computer unit, and/or after a shock detected by means of a position sensor, a movement, or after a change in the position of the projection unit and/or the sensor units.

According to an alternative embodiment variant of the method according to the invention, the computer unit continuously adjusts the projection distortion based on a known geometry of the individual constructional elements arranged on the projection surface in order to always ensure an undistorted, plane representation of the plan in real dimensions.

If the number, the shape and the position of the constructional elements arranged on the projection surface correspond to the number, shape and position intended in the projected plan, according to a preferred embodiment variant of the method according to the invention, a projection distortion is performed on a further plan by means of the computer unit based on the surface shape and the location of the projection surface in relation to the projection unit and the sensor units, as detected in the calibration step, and the distorted further plan is projected by the projection unit onto the projection surface in such a way that the projected further plan on the projection surface corresponds to an undistorted, plane representation of the further plan in real dimensions. The further plan can, for example, represent a plan of a subsequent work section or of a further construction phase.

In addition, in the preferred embodiment variant, the steps of:

detecting the position of persons and/or objects within and preferably in the vicinity of the projection surface by means of the sensor units, and issuing an optical and/or acoustic signal by means of the projection unit and/or a loudspeaker, if a person approaches a predetermined area of the projected plan closer than by a predetermined distance, are provided in the method according to the invention. By issuing the optical and/or acoustic signal, a warning is issued to all people working on a workpiece in order to prevent anyone from entering a potential danger zone. Further equipment, such as, for example, cranes, robotic arms and the like, can preferably also be connected to the computer unit, with the computer unit transmitting a stop signal or, respectively, a shutdown command to this equipment in such a case. This contributes significantly to increasing work safety. Preferably, gestures performed by the detected persons or signals arranged on the projection surface, such as, e.g., points of light, and control markings can also be detected by the sensor unit, with the computer unit being set up to interpret them as control signals.

Preferably, the determination of the deviation of the position and/or the shape of the constructional element arranged on the projection surface from the position intended for this constructional element in the projected plan and/or the predetermined shape occurs by means of the sensor units using a grid reflection method, with the projected plan being used as the transmitter grid. This must allow the determination of the deviation to be made without replacing the projected plan with a different transmission pattern, for which the work on a workpiece might possibly have to be interrupted.

Furthermore, during the implementation of the process steps, in particular during the implementation of the process step of arranging at least one constructional element contained in the projected plan, a point in time at which the process step begins and/or a point in time at which the process step ends is/are preferably each time recorded by the computer unit, with the recorded points in times being readable via an interface of the computer unit. In particular, it becomes possible in this way to fully automatically record when the method was carried out and, in particular, when which constructional element was arranged. Furthermore, it could be possible to store the points in times at which the calibration was performed in order to validate afterwards that the method was carried out properly. For example, a list can be kept in the computer unit as to when which activity began and ended. Such granular time recording is particularly valuable for companies which implement the method, since evidence about the method that has been carried out is always available and, respectively, the mode of operation can be optimized.

According to the invention, the present object is also achieved by providing a computer program product which is designed for implementing the method according to the invention.

BRIEF DESCRIPTION OF THE DRAWINGS

Advantageous configurations of the method according to the invention and of the computer program product according to the invention are explained in further detail below with reference to the figures.

DETAILED DESCRIPTION

Figure 1:
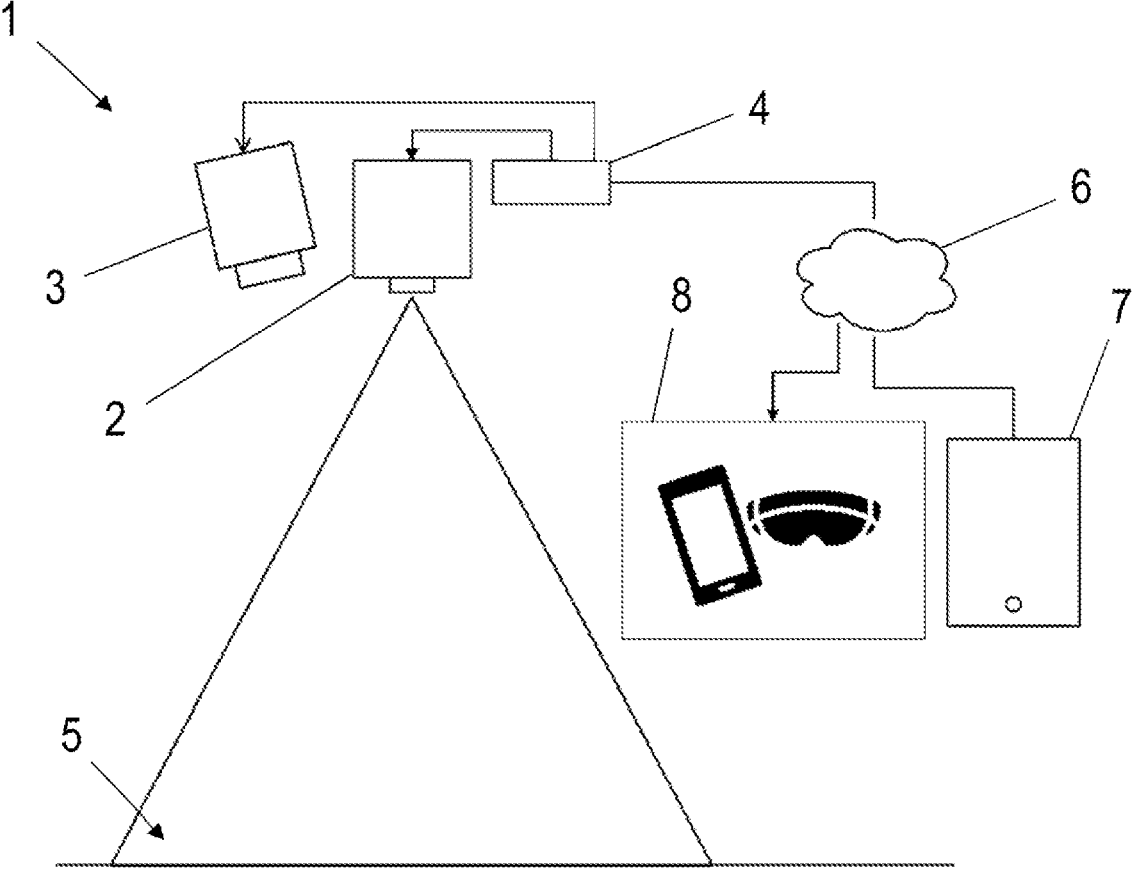
FIG. 1 exemplifies a device for implementing the method according to the invention for visualizing a plan in real dimensions in a schematic diagram.

The device 1 illustrated in FIG. 1 for carrying out the method according to the invention comprises a projection unit 2 and a sensor unit 3. In addition, the device 1 comprises a computer unit 4 connected to the sensor unit 3 and the projection unit 2. In the method according to the invention for visualizing a plan in real dimensions, a transmission pattern is projected in a calibration step onto a projection surface 5 by means of the projection unit 2 using a grid reflection method. A reception pattern reflected from the projection surface 5 is consequently detected by the sensor unit 3. For example, the transmission pattern can constitute a standardized grid of black and white lines. Various transmission patterns that are applicable within the scope of a grid reflection method are generally known to a person skilled in the art. According to the invention, several sensor units 3 can also be provided. This can be seen in FIGS. 3a to 3c. The method according to the invention is carried out by means of at least two sensor units 3. The second sensor unit 3, which is not illustrated in FIG. 1, can be arranged, for example, on an opposite side of the projection unit 2. In particular, the two sensor units 3 record the image of a common projection unit 2. The projection unit 2 can, for example, be a conventional digital light projector, and the sensor unit 3, or the sensor units 3, can be provided in the form of a digital camera. Other forms of the sensor unit 3 and the projection unit 2 are generally known to those skilled in the art. Using the computer unit 4 connected to the projection unit 2 and the sensor units 3, a surface shape and a location of the projection surface 5 in relation to a position of the projection unit 2 and to a position of the sensor unit 3 are then detected on the basis of a distortion of the reception pattern in comparison to the transmission pattern. In FIG. 1, the projection surface 5 is depicted as a flat surface and without inclination. However, the projection surface 5 can generally have an unspecified surface shape, e.g., with dents and grooves, and an inclination. However, the calibration step of the method according to the invention permits the application of the method according to the invention even in case of complex surface shapes and surface inclinations of the projection surface 5. This is particularly advantageous if the method according to the invention is applied, for example, on an already prefabricated machine part.

Figure 2A:
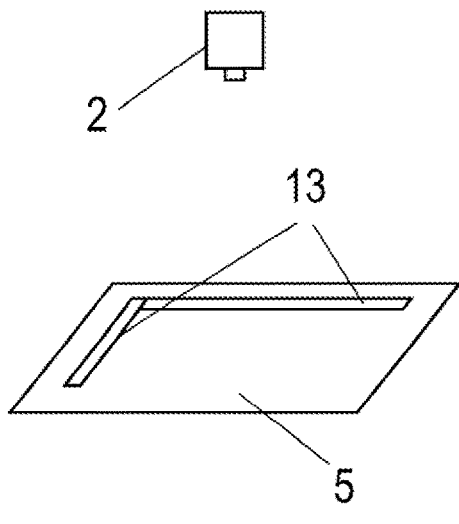
FIG. 2a to FIG. 2c show the projection of a plan onto a projection surface using the method according to the invention.
Figure 2B:
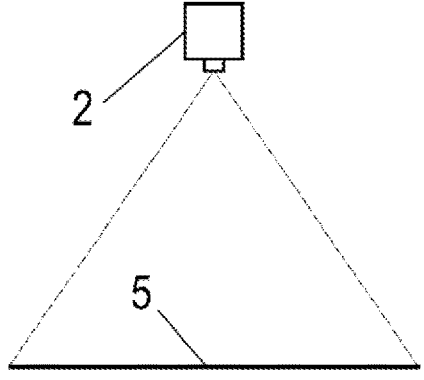
Figure 2C:
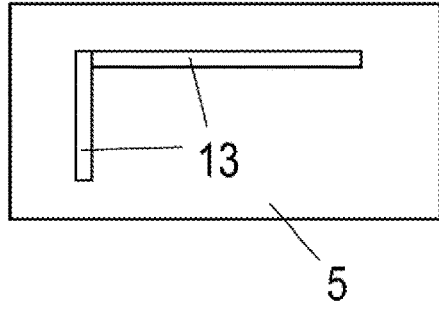

In a further step of the method according to the invention, a projection distortion is performed on the plan by means of the computer unit 4 based on the surface shape and the location of the projection surface 5 in relation to the projection unit 2, as detected in the calibration step, and the distorted plan is projected by the projection unit 2 onto the projection surface 5 in such a way that the projected plan 13 on the projection surface 5, which plan can be seen, for example, in FIGS. 2a and 2c, corresponds to an undistorted, plane representation of the plan in real dimensions. This means that the dimensions indicated in the projected plan 13 essentially correspond precisely to the real dimensions. In other words, for example, a straight line indicated in the plan with a length of 1 metre is also reflected in the projected plan 13 on the projection surface 5 as a plane, straight line with a length of 1 metre, regardless of whether the surface of the projection surface 5 has a curvature in the course of the line or not. Such a curvature is detected in the calibration step and compensated for by the projection distortion. The projection of the plan is illustrated in detail in FIGS. 2a to 2c, with FIG. 2a showing a perspective view of the projection of the plan onto the projection surface 5. FIG. 2b illustrates a side view of FIG. 2a. FIG. 2c shows the projection surface 5 with the projected plan 13 in real dimensions in a plan view.

The method according to the invention thus allows to project a true-to-scale plan in real dimensions on essentially any surface. As a result, for example, construction work can be performed directly on the projection surface 5 without a separate plan having to be used and interpreted. Due to the projected plan 13, direct checking of any work step is enabled, and the risk of a construction plan being misinterpreted by construction personnel is reduced. Furthermore, support and instructions can be projected onto the projection surface 5 by means of the projection unit 2. It is also possible to intervene in a sequence control, for example, in case of semi-automated manufacture, and/or resources can be reassigned.

The method according to the invention preferably comprises a pre-calibration step performed prior to the calibration step. In the pre-calibration step, the projection unit 2 and the at least two sensor units 3 are fixed in a relative position to one another, and a calibration pattern is projected by the projection unit 2 onto a calibration surface placed at a predefined distance from the projection unit 2 and in a location predefined in relation to the projection unit 2. Thereupon, the computer unit 4 determines the mutual relative position of the at least two sensor units 2 and the projection unit 3 on the basis of images of the calibration pattern on the calibration surface which have been detected by the sensor units 3. The calibration pattern can, for example, also be a photo, a grid or the like.

Via the pre-calibration step, a manual determination can occur, for example, under controlled conditions, e.g., by measuring the relative position of the sensor units 3 and the projection unit 2 in advance. For this purpose, the at least two sensor units 3 and the projection unit 2 are pre-assembled, for example, on a common support plate or a common supporting framework. This is placed at the predefined distance from the calibration surface, and the pre-calibration step is performed as described above. In this case, pre-assembly and pre-calibration are rendered possible, whereby measuring the relative positions of the sensor units 3 and the projection unit 2, e.g., in an assembly hall, can be omitted.

The calibration step is preferably repeated after a predetermined period of time, after a change in a temperature of the projection unit 2 by more than a predetermined threshold value, as detected by means of a temperature sensor, after a user input on the computer unit 4, and/or after a shock or, respectively, movement of the projection unit 2 and/or the sensor unit 3 or, respectively, the sensor units 3, as detected by means of a position sensor. In this way, it is ensured that the projected plan 13 is true to scale at any time and the dimensions contained in the projected plan 13 correspond to the real dimensions. The user input can also be transmitted to the computer unit 4, for example, via a network 6, which can be seen in FIG. 1 and with which the computer unit 4 can be connected, or via a remote control 7. The temperature sensor and the position sensor are not visible in FIG. 1. The remote control 7 can be provided in the form of a smartphone, a tablet computer and the like, for example. Monitoring the temperature of the projection unit 2 is expedient because thermal loads on the projection unit 2 result in a dimensional change, for example, in a lens system of the projection unit 2. The consequence of this is that the projected plan 13 is additionally distorted. To compensate for such a distortion, the calibration step can be performed again.

Figure 3A:
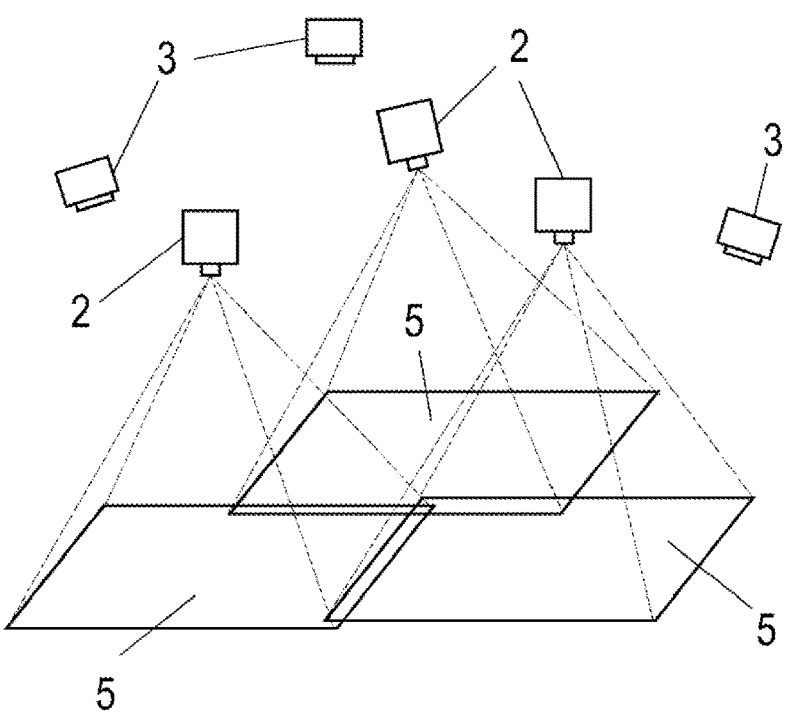
FIG. 3a to FIG. 3c show the use of several projection units and sensor units in the method according to the invention.
Figure 3B:
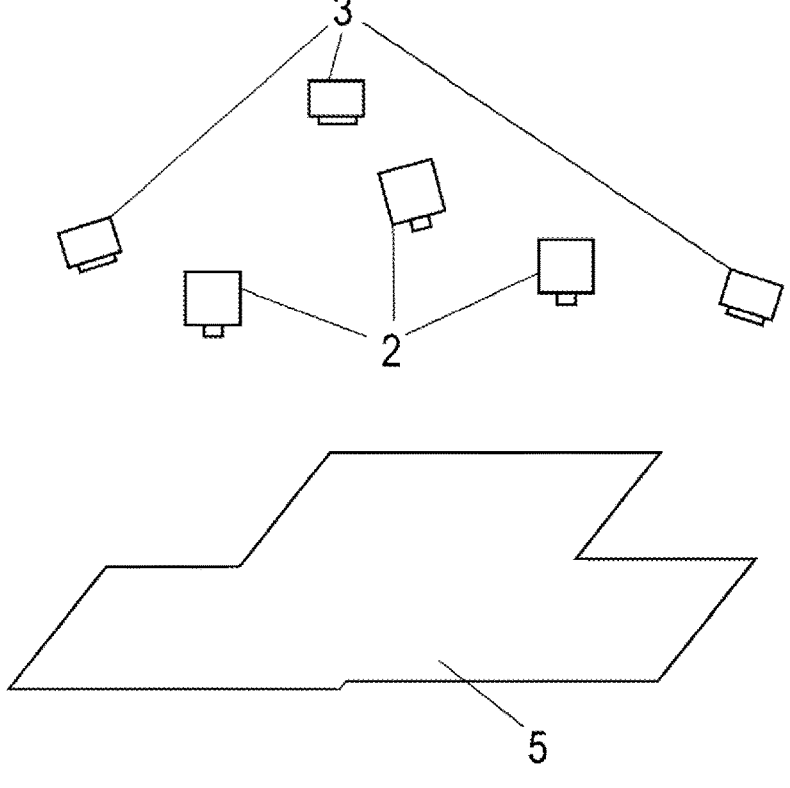

According to an alternative embodiment variant of the method according to the invention, which can be seen in FIGS. 3a and 3b, the calibration step can be performed additionally for at least one second projection unit 2. The method according to the invention with three projection units 2 and three sensor units 3 is illustrated in FIG. 3a and FIG. 3b. In this case, a second transmission pattern is projected onto the projection surface 5 by means of the at least one second projection unit 2, and a second reception pattern reflected from the projection surface 5 is detected by the sensor unit 3 or, respectively, the sensor units 3. According to this embodiment variant, the computer unit 4 is also connected to the second projection unit 2. The computer unit 4 is preferably connected to all the projection units 2 and sensor units 3 used within the scope of the method according to the invention. Using the computer unit 4 connected to the at least one second projection unit 2 and the sensor unit 3, the surface shape and the location of the projection surface 5 in relation to a position of the at least one second projection unit 2 and to the position of the sensor units 3 are detected, based on a distortion of the second reception pattern in comparison to the second transmission pattern. Using the computer unit 4, a projection distortion is performed on a second plan based on the surface shape and the location of the projection surface 5 in relation to the second projection unit 2, as detected in the calibration step, and the distorted second plan is projected by the second projection unit 2 onto the projection surface 5 in such a way that the projected second plan on the projection surface 5 corresponds to an undistorted, plane representation of the second plan in real dimensions. In this way, it becomes possible to project more than one plan simultaneously or alternatively. The second plan can also be an extension of the first plan, in which case the second plan and the first plan can also at least partially overlap. Each of the plans is projected onto the projection surface 5. This can be seen in FIG. 2a. As a result, it becomes possible to expand the area of the projection surface 5 used within the scope of the method according to the invention as desired. FIG. 2b shows the area of the projection surface 5 that is utilized by the arrangement illustrated in FIG. 2a. Several projection units 2 can thus project different parts of an overall plan onto at least partially overlapping or even different areas of the projection surface 5. The projected plans 13 can also comprise different partial assembly sections such as installation plans, electrical plans and/or reinforcement plans. In addition, the accuracy or, respectively, the resolution of the projected plans 13 can also be increased as a result. This can also be done by reducing the distance between the projection unit 2 or the projection units 2 and the projection surface 5 or by increasing the focal length of the projection unit 2 or the projection units 2. Both of these approaches also lead to an increase in the luminance and brightness of the projected plan 13 or the projected plans 13.

According to a preferred embodiment variant of the method according to the invention, a position marker 12 is included in the projected plan 13. An exemplary position marker 12 can be seen in FIG. 3c. In this embodiment variant, the method comprises detecting the position marker 12 with an augmented reality-enabled portable device 8 such as a smartphone, augmented reality glasses, or a tablet computer. The augmented reality-enabled portable device 8 determines its position in relation to the projected plan 13 on the basis of the detected position marker 12 and preferably the position of the sensor unit 3 or, respectively, the sensor units 3 and/or the projection unit 2 and supplements the projected plan 13 with a two-dimensional or three-dimensional representation of a constructional element 14 in real dimensions. As a result, the method according to the invention enables a specific worker or, respectively, user to have access to additional and, if required, also spatial information which, for example, might not be relevant to other workers. In addition, it thereby becomes possible to display elements that are possibly covered by other constructional elements 14 in the projected plan 13. The placement of constructional elements 14 on the projection plane 5 is explained below with reference to FIG. 4a to FIG. 4c.

Figure 3C:
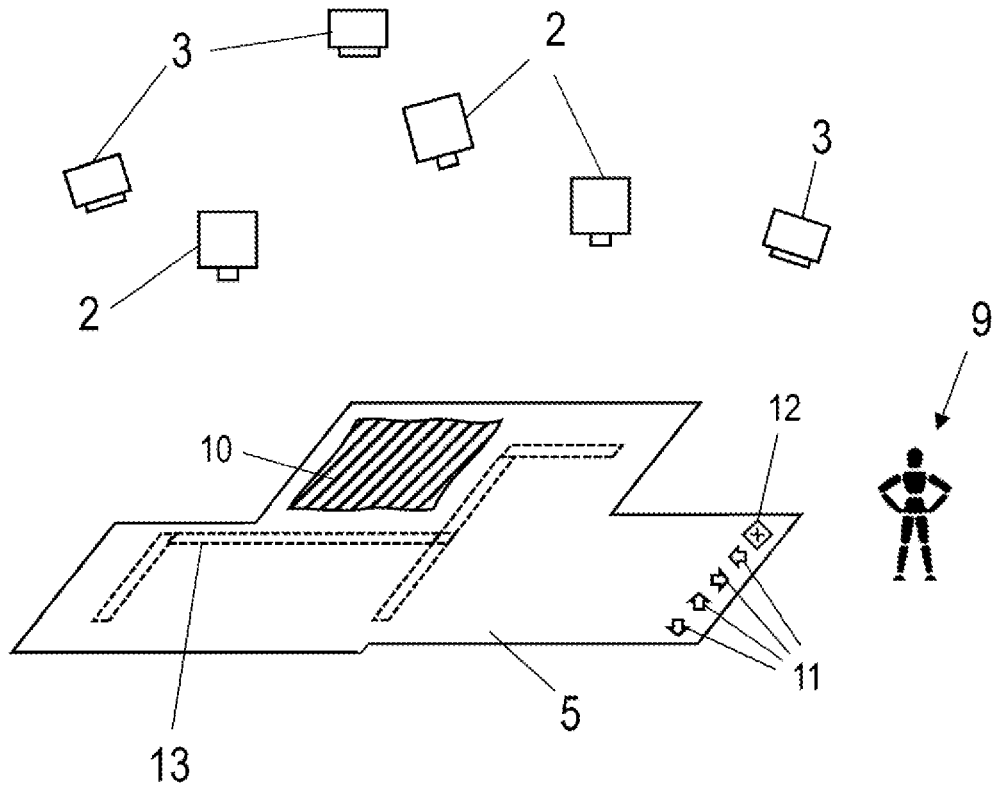

In addition, the position of a position marker 12, which is attached to the projection surface 5 and is visible in FIG. 3c, can also be detected by means of the computer unit 4 in the calibration step using the sensor unit 3 or, respectively, the sensor units 3. For example, the position marker 12 can be glued or painted onto the projection surface. This position marker 12 can subsequently also be detected by the augmented reality-enabled portable device 8, the augmented reality-enabled portable device 8 determining its position in relation to the projected plan 13 on the basis of the detected position marker 12 and preferably the position of the sensor unit 3 and/or the projection unit 2.

In addition, a three-dimensional representation of a constructional element 14 can be projected onto the projection surface 5 with the projection unit 2. This is done by means of a perspective distortion, for example, of a 3D model of the constructional element 14 with the computer unit 4, involving the projection distortion. The three-dimensional representation can also include at least two two-dimensional sectional representations of the constructional element 14 that are translationally displaced in the projection surface 5 and preferably at least partially overlap. In this case, the sectional representations are arranged in the projection plane 5 according to the perspective distortion and the projection distortion.

The method according to the invention is preferably a method for the construction of an object, additionally comprising the arrangement of at least one constructional element 14 contained in the projected plan 13 according to a position on the projection surface 5 that is intended for this constructional element 14 in the projected plan 13. Subsequently, a deviation of a position and/or a shape of the constructional element 14 arranged on the projection surface 5 from the position intended for this constructional element 14 in the projected plan 13 and/or a predetermined shape is detected by means of the sensor unit 3 or, respectively, the sensor units 3. Thereupon, the position of the constructional element 14 arranged on the projection surface 5 is corrected so that it corresponds to the position intended for this constructional element 14 in the projected plan 13. Alternatively or additionally, the constructional element 14 arranged on the projection surface 5 is replaced with a constructional element 14 whose shape corresponds to the predetermined shape. In this way, it is ensured that the correct constructional elements 14 are arranged or, respectively, installed in the correct position according to the projected plan 13. Due to the plane representation of the plan in real dimensions, an incorrect arrangement or the use of an incorrect constructional element 14 is immediately apparent to the personnel. For example, the use of a reinforcing element that is too long or too thick would be readily apparent by comparison with the projected plan 13.

In addition, the method of constructing the object preferably comprises issuing an optical and/or acoustic signal by means of the projection unit 2 and/or a loudspeaker, which is not illustrated in FIG. 1. This occurs when the position and/or the shape of the constructional element 14 on the projection surface 5 deviates from and/or corresponds to the position intended for this constructional element 14 in the projected plan 13 and/or the predetermined shape. As a result, the advantage is obtained that either a confirmation signal is issued which indicates that the correct constructional element 14 has been arranged in the correct position, or an alert signal is issued which indicates a faulty or incorrect constructional element 14 and/or an arrangement not according to plan.

In addition, using the method according to the invention, a marking on the constructional element 14 arranged on the projection surface 5 can also be detected by means of the sensor unit 3 or, respectively, the sensor units 3, and the constructional element 14 can be identified on the basis of the detected marking. For example, a serial number, a material or a type of the constructional element 14 can be determined by the computer unit 4 on the basis of the detected marking. The method according to the invention can comprise matching the marking of the constructional element 14 arranged on the projection surface 5 with a marking predetermined for this constructional element 14 and, in case of a deviation of the detected marking from the predetermined marking, replacing the constructional element 14 with a constructional element 14 having a marking corresponding to the predetermined marking. The marking on the constructional element 14 can be, for example, a colour, a geometric shape such as a QR code or the like.

According to the invention, the method preferably furthermore comprises the steps of detecting a number of constructional elements 14 arranged on the projection surface 5 by means of the sensor unit 3 or, respectively, the sensor units 3 and comparing the detected number of constructional elements 14 with a number of constructional elements 14 as intended in the projected plan 13. As a result, it is ensured that no constructional element 14 is overlooked. In addition, it can be envisaged that an optical and/or acoustic signal is issued by means of the projection unit 2 and/or the loudspeaker, if the detected number of constructional elements 14 corresponds to and/or deviates from the intended number of constructional elements 14.

In addition, the calibration step is preferably performed once more, if the shape and the position of the constructional elements 14 arranged on the projection surface 5 correspond to the number, shape and position intended in the projected plan 13. In this case, the calibration is carried out with the constructional elements 14 arranged on the previous projection surface 5. The surface shape of the projection surface 5 is altered in the course of time by the arrangement of the constructional elements 14 on the projection surface 5. As a result, distortions arise in the projected plan 13, which cannot be compensated for by the projection distortion, since they could not be detected in the previous calibration step. In order to compensate for them, the calibration step is performed once more, as a result of which the changed surface shape of the projection surface 5 with the constructional elements 14 arranged thereon can be detected and subsequently can be compensated for by means of the projection distortion.

According to an alternative embodiment variant of the method according to the invention, the computer unit 4 continuously adjusts the projection distortion based on a known geometry of the individual constructional elements

14 arranged on the projection surface 5 in order to always ensure an undistorted, plane representation of the plan in real dimensions.

Figure 4A:
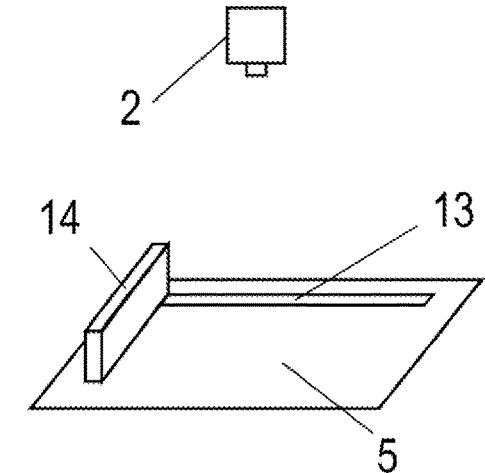
FIG. 4a to FIG. 4c show a compensation for a change in a surface shape of the projection surface due to a constructional element in a plan projected using the method according to the invention.
Figure 4B:
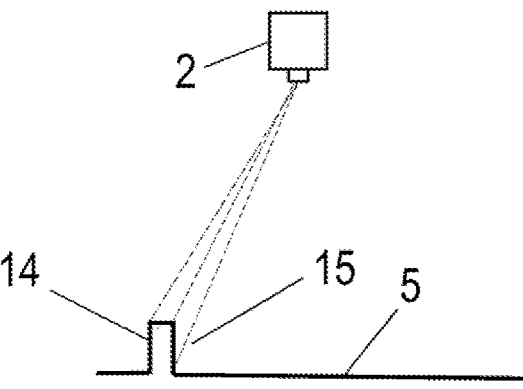
Figure 4C:
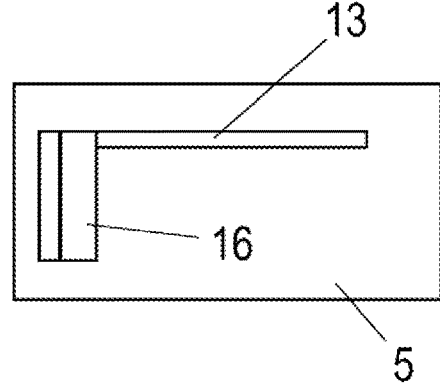

The adjustment of the projected plan 13 to the changed geometry of the surface of the projection plane 5 can be seen in FIG. 4a to FIG. 4c. In FIG. 4a, a constructional elemental 14 is arranged at an intended position in the projected plan 13 on the projection plane 5. As a result, the surface shape of the projection plane 5 changes, since the constructional element 14 is now arranged therein, as can be seen in FIG. 4b. This causes an additional distortion of the projected plan 13, as a result of which the projected plan 13 would no longer be shown in real dimensions at the location of the constructional element 14. The representation of the projected plan 13 can now be corrected either, as described above, by performing the calibration step again, or by including the known geometry of the constructional element 14 in the projection distortion, in order to again achieve an undistorted representation of the projected plan 13 in real dimensions. If this is done, the height of the constructional element 14 is taken into account in the projected plan, among other things. FIG. 4c shows how the representation of the projected plan 13 is altered as a result. FIG. 4c shows the projection plane with the projected plan 13 after the constructional element 14 would have been removed again without performing a new adjustment of the projection distortion. The corrected height of a side wall 15 of the constructional element 14 leads to an additional width 16 of the constructional element 14 in the projected plan 13, which is projected onto the side wall 15 of the constructional element 14 as long as the constructional element 14 is arranged in the projection surface 5.

As a result, the changed surface shape of the projection surface 5 is taken into account in the projected plan 13, whereby the projected plan 13 on the projection surface 5 again corresponds to an undistorted, plane representation of the plan in real dimensions. The calibration step can also be repeated at any time, as already mentioned, for example, after a predetermined period of time, after a change in a temperature of the projection unit 2 by more than a predetermined threshold value, as detected by means of a temperature sensor, after a user input on the computer unit 4, and/or after a shock detected by means of a position sensor, a movement, or after a change in the position of the projection unit 2 and/or the sensor unit 3 or, respectively, the sensor units 3. A shadow generated in the projection surface 5 by the constructional element 14 can, for example, be compensated for by providing a further projection unit 2, as shown in FIGS. 3a to 3c.

According to the preferred embodiment variant of the method according to the invention, a projection distortion is performed on a further plan by means of the computer unit 4 based on the surface shape and the location of the projection surface 5 in relation to the projection unit 2, as detected in the calibration step, if the number, the shape and the position of the constructional elements 14 arranged on the projection surface 5 correspond to the number, shape and position intended in the projected plan 13. The distorted further plan is subsequently projected by the projection unit 2 onto the projection surface 5 in such a way that the projected further plan on the projection surface 5 corresponds to an undistorted, plane representation of the further plan in real dimensions. In this way, it becomes possible, upon completion of a specific construction phase or a construction section, to project a new plan for the next section onto the projection plane 5 with the constructional elements arranged thereon, the new plan, in turn, corresponding to an undistorted, plane representation of the further plan in real dimensions.

As illustrated in FIG. 3c, the method according to the invention preferably comprises detecting the position of persons 9 and/or objects within and preferably in the vicinity of the projection surface 5 by means of the sensor unit 3 or, respectively, the sensor units 3 for increasing the safety of construction personnel. In addition, an optical and/or acoustic signal is issued by means of the projection unit 2 and/or the loudspeaker, if a person 9 approaches a predetermined area 10 of the projected plan 13 closer than by a predetermined distance. As a result, a warning is provided, if a person 9 approaches or enters a danger zone. Further equipment, such as, for example, cranes, robotic arms and the like, can preferably also be connected to the computer unit 4 via the network 6, with the computer unit 4 transmitting a stop signal or, respectively, a shutdown command to this equipment in such a case. This contributes significantly to increasing work safety. The detection of the persons 9 can occur, for example, by means of an image recognition method performed by the computer unit 4. As an alternative or in addition to this, the persons 9 can wear, for example, helmets in signal colours or an identification label which can be detected by the sensor unit 3 or, respectively, the sensor units 3 and can be easily detected by the computer unit 4.

Preferably, as illustrated in FIG. 3c, gestures performed by the detected persons 9 or signals 11 arranged on the projection surface 5, such as, e.g., points of light and/or control markings, can also be detected by the sensor unit 3 or, respectively, the sensor units 3, with the computer unit 4 being set up to interpret them as control signals. Alternatively, the signals 11 being covered by a hand of the person 9, for example, can also be detected by the sensor unit 3 or, respectively, the sensor units 3, with the computer unit 4 interpreting the covering of at least one of the signals 11 as a control signal. An opportunity for user input is thereby provided. A control signal can comprise, for example, a request for a change in the projected plan 13, e.g., the replacement of a reinforcement plan with a wiring plan. The signals 11 can either be projected onto the projection surface 5 by means of the projection unit 2, or painted, glued or otherwise applied onto the projection surface 5.

Preferably, the determination of the deviation of the position and/or the shape of the constructional element 14 arranged on the projection surface 5 from the position intended for this constructional element 14 in the projected plan 13 and/or the predetermined shape occurs by means of the sensor unit 3 or, respectively, the sensor units 3 using a grid reflection method. In doing so, the projected plan 13 is used as the transmission grid. Thus, in this determination step, a separate pattern does not have to be projected onto the projection surface 5, and the determination can be made without interfering with the operations of the construction personnel.

The computer program product according to the invention, which is designed for implementing the method according to the invention, can be executed on the computer unit 4 in order to control the further components such as the sensor unit 3 or, respectively, the sensor units 3 and the projection unit 2. The computer program product can also be provided on a data storage unit such as a USB flash drive, a hard disk or a cloud storage.

The invention claimed is:

1. A method of visualizing a plan in real dimensions, wherein, in a calibration step, using a grid reflection method, a transmission pattern is projected onto a projection surface by means of a projection unit, and a reception pattern reflected from the projection surface is detected by at least two sensor units, and a surface shape and a location of the projection surface in relation to a position of the projection unit and to a position of the sensor units are detected by means of a computer unit connected to the projection unit and the sensor units, based on a distortion of the reception patterns in comparison to the transmission pattern, and a projection distortion is performed on the plan by means of the computer unit based on the surface shape and the location of the projection surface in relation to the projection unit, as detected in the calibration step, and the distorted plan is projected by the projection unit onto the projection surface in such a way that the projected plan on the projection surface corresponds to an undistorted, plane representation of the plan in real dimensions, wherein the method furthermore comprises, prior to said calibration step:

installing a first system including the at least two sensor units and the projection unit on a first support in a relative position to one another, pre-calibrating the two sensor units and the projection unit relative to one another in a reference environment, the computer unit determining the relative position of the two sensor units and the projection unit relative to one another on a basis of recordings of the calibration pattern on the calibration surface, as detected by the sensor units, moving the first support with the two sensor units installed thereon and the projection unit from the reference environment to a place of use where said calibration step and the projection of the distorted plan are carried out.

2. The method according to claim 1, further comprising a second support, wherein the second support comprises a second system including at least two sensor units and one projection unit, wherein the first support with the first system and the second support with the second system are pre-calibrated and installed at the place of use where the calibration step is carried out for first and second systems located on the respective first and second supports, wherein the sensor units of the first and second systems each have a field of view such that a transmission pattern emitted by the projection unit of the first system is located at least partially within a field of view of the sensor units of the second system so that a relative mutual distance between the first and second systems can be determined.

3. The method according to claim 1, wherein the calibration step is repeated after a predetermined period of time, after a change in a temperature of the projection unit by more than a predetermined threshold value, as detected by means of a temperature sensor, after a user input on the computer unit, and/or after a shock or movement of the projection unit and/or the sensor units, as detected by means of a position sensor.

4. The method according to claim 1, wherein the calibration step is performed additionally for at least one second projection unit, with a second transmission pattern being projected onto the projection surface by means of the at least one second projection unit, and a second reception pattern reflected from the projection surface being detected by the sensor units, and the surface shape and the location of the projection surface in relation to a position of the at least one second projection unit and to the position of the sensor units are detected by means of the computer unit connected to the at least one second projection unit and the sensor units, based on a distortion of the second reception pattern in comparison to the second transmission pattern;

a projection distortion is performed on a second plan by means of the computer unit based on the surface shape and the location of the projection surface in relation to the second projection unit, as detected in the calibration step, and the distorted second plan is projected by the second projection unit onto the projection surface in such a way that the projected second plan on the projection surface corresponds to an undistorted, plane representation of the second plan in real dimensions.

5. The method according to claim 4, further comprising steps of:

detecting a number of constructional elements arranged on the projection surface by means of the sensor units;

comparing the detected number of constructional elements with a number of constructional elements as intended in the projected plan.

6. The method according to claim 5, further comprising a step of:

issuing an optical and/or acoustic signal by means of the projection unit and/or a loudspeaker, if the detected number of constructional elements corresponds to and/ or deviates from the intended number of constructional elements.

7. The method according to claim 5, wherein the calibration step is performed once more, if the number, the shape and the position of the constructional elements arranged on the projection surface correspond to the number, shape and position intended in the projected plan.

8. The method according to claim 5, wherein, if the number, the shape and the position of the constructional elements arranged on the projection surface correspond to the number, shape and position intended in the projected plan, a projection distortion is performed on a further plan by means of the computer unit based on the surface shape and the location of the projection surface in relation to the projection unit, as detected in the calibration step, and the distorted further plan is projected by the projection unit onto the projection surface in such a way that the projected further plan on the projection surface corresponds to an undistorted, plane representation of the further plan in real dimensions.

9. The method according to claim 1, wherein at least one position marker is included in the projected plan, and the method comprises detecting the position marker with an augmented reality-enabled portable device, the augmented reality-enabled portable device determining its position in relation to the projected plan on the basis of the detected position marker and supplementing the projected plan with a two-dimensional or three-dimensional representation of a constructional element in real dimensions.

10. The method according to claim 9, wherein the augmented reality-enabled portable device is a smartphone, augmented reality glasses, or a tablet computer.

11. A method of constructing an object, comprising the method of visualizing a plan in real dimensions according to claim 1, comprising steps of:

arranging at least one constructional element contained in the projected plan according to a position on the projection surface that is intended for this constructional element in the projected plan;

determining a deviation of a position and/or a shape of the constructional element arranged on the projection surface from the position intended for this constructional element in the projected plan and/or a predetermined shape, using the sensor units;

correcting the position of the constructional element arranged on the projection surface so that it corresponds to the position intended for this constructional element in the projected plan and/or replacing the constructional element arranged on the projection surface with a constructional element whose shape corresponds to the predetermined shape.

12. The method according to claim 11, further comprising steps of:

issuing an optical and/or acoustic signal by means of the projection unit and/or a loudspeaker, if the position and/or the shape of the constructional element on the projection surface deviates from and/or corresponds to the position intended for this constructional element in the projected plan and/or the predetermined shape.

13. The method according to claim 11, further comprising steps of:

detecting a position of a person within the projection surface by means of the sensor units, and issuing an optical and/or acoustic signal by means of the projection unit and/or a loudspeaker, if the person approaches a predetermined area of the projected plan closer than by a predetermined distance.

14. The method according to claim 11, wherein the determination of the deviation of the position and/or the shape of the constructional element arranged on the projection surface from the position intended for this constructional element in the projected plan and/or the predetermined shape occurs by means of the sensor units using a further grid reflection method, the projected plan being used as a further transmission grid.

15. The method according to claim 1, wherein, during implementation of a process step of arranging at least one constructional element contained in the projected plan, a point in time at which the process step begins and/or a point in time at which the process step ends is/are each time recorded by the computer unit, with the recorded points in times being readable via an interface of the computer unit.

16. A computer program product comprising a non-transitory computer readable medium including instructions configured to perform the method according to claim 1.

17. A method of visualizing a plan in real dimensions, wherein, in a calibration step, using a grid reflection method, a transmission pattern is projected onto a projection surface by means of a projection unit, and a reception pattern reflected from the projection surface is detected by at least two sensor units, and a surface shape and a location of the projection surface in relation to a position of the projection unit and to a position of the sensor units are detected by means of a computer unit connected to the projection unit and the sensor units, based on a distortion of the reception patterns in comparison to the transmission pattern, and a projection distortion is performed on the plan by means of the computer unit based on the surface shape and the location of the projection surface in relation to the projection unit, as detected in the calibration step, and the distorted plan is projected by the projection unit onto the projection surface in such a way that the projected plan on the projection surface corresponds to an undistorted, plane representation of the plan in real dimensions, wherein the calibration step is repeated after a predetermined period of time, after a change in a temperature of the projection unit by more than a predetermined threshold value, as detected by means of a temperature sensor, after a user input on the computer unit, and/or after a shock or movement of the projection unit and/or the sensor units, as detected by means of a position sensor.

18. A method of visualizing a plan in real dimensions, wherein, in a calibration step, using a grid reflection method, a transmission pattern is projected onto a projection surface by means of a projection unit, and a reception pattern reflected from the projection surface is detected by at least two sensor units, and a surface shape and a location of the projection surface in relation to a position of the projection unit and to a position of the sensor units are detected by means of a computer unit connected to the projection unit and the sensor units, based on a distortion of the reception patterns in comparison to the transmission pattern, a projection distortion is performed on the plan by means of the computer unit based on the surface shape and the location of the projection surface in relation to the projection unit, as detected in the calibration step, and the distorted plan is projected by the projection unit onto the projection surface in such a way that the projected plan on the projection surface corresponds to an undistorted, plane representation of the plan in real dimensions, detecting a number of constructional elements arranged on the projection surface by means of the sensor units; and comparing the detected number of constructional elements with a number of constructional elements as intended in the projected plan.

\* \* \* \* \*